US008531818B2

(12) United States Patent
Hashimoto et al.

(10) Patent No.: US 8,531,818 B2
(45) Date of Patent: Sep. 10, 2013

(54) ELECTRIC DOUBLE LAYER CAPACITOR AND METHOD FOR MANUFACTURING THE SAME

(75) Inventors: Yasuhiro Hashimoto, Nara (JP); Takuma Asari, Osaka (JP); Hironori Kumagai, Osaka (JP); Shigeo Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 13/060,383

(22) PCT Filed: Nov. 6, 2009

(86) PCT No.: PCT/JP2009/005898
§ 371 (c)(1),
(2), (4) Date: Feb. 23, 2011

(87) PCT Pub. No.: WO2010/067509
PCT Pub. Date: Jun. 17, 2010

(65) Prior Publication Data
US 2011/0149465 A1    Jun. 23, 2011

(30) Foreign Application Priority Data

Dec. 8, 2008  (JP) .................................. 2008-312358

(51) Int. Cl.
*H01G 9/155* (2011.01)
(52) U.S. Cl.
USPC ........................................ 361/502; 29/25.03
(58) Field of Classification Search
USPC ................... 361/502, 503; 29/25.03
See application file for complete search history.

(56) References Cited

U.S. PATENT DOCUMENTS

| 6,097,587 A * | 8/2000 | Inagawa et al. ............... 361/502 |
| 6,426,865 B2 * | 7/2002 | Kasahara et al. ............ 361/512 |
| 2002/0096661 A1 | 7/2002 | Shinozaki et al. |

FOREIGN PATENT DOCUMENTS

| JP | 2-847 | 1/1990 |
| JP | 07320987 A * | 12/1995 |

(Continued)

OTHER PUBLICATIONS

Interim Report 2006: by New Energy and Industrial Technology Development Organization, Nanotechnology Program, Carbon Nanotube Capacitor Developement Project, with Partial English Translation.

*Primary Examiner* — Eric Thomas
(74) *Attorney, Agent, or Firm* — McDermott Will & Emery LLP

(57) ABSTRACT

An electric double layer capacitor 200 is configured such that a positive electrode 206, a separator 205, and a negative electrode 207 stacked in this order are contained in a container, and a portion between the positive electrode 206 and the negative electrode 207 is filled with an electrolytic solution. A polar plate of one or each of the positive electrode 206 and the negative electrode 207 includes a current collector 201, 203 and a plurality of electrically-conductive fine fibers 202, 204 formed and standing on a surface of the current collector such that one end of each of the fine fibers is electrically connected to the surface of the current collector. A surface of the polar plate is covered with the separator 205, the surface corresponding to the surface of the current collector. The polar plate and the separator 205 are pressure bonded to be integrated with each other. In the electric double layer capacitor using the electrically-conductive fine fiber, such as a carbon nanotube, as an active material, energy density can be increased by densely compressing the active material.

15 Claims, 14 Drawing Sheets

(56) References Cited

FOREIGN PATENT DOCUMENTS

| | | |
|---|---|---|
| JP | 10-241656 | 9/1998 |
| JP | 11-097295 | 4/1999 |
| JP | 2001-284188 | 10/2001 |
| JP | 2002-299169 | 10/2002 |
| JP | 2003-500325 | 1/2003 |
| JP | 2005-007861 | 1/2005 |
| JP | 2005-145743 | 6/2005 |
| JP | 2005-252116 | 9/2005 |
| JP | 2006179431 A * | 7/2006 |
| JP | 2007035811 A * | 2/2007 |
| JP | 2007-173039 | 7/2007 |
| WO | WO 00/73204 A1 | 12/2000 |

* cited by examiner

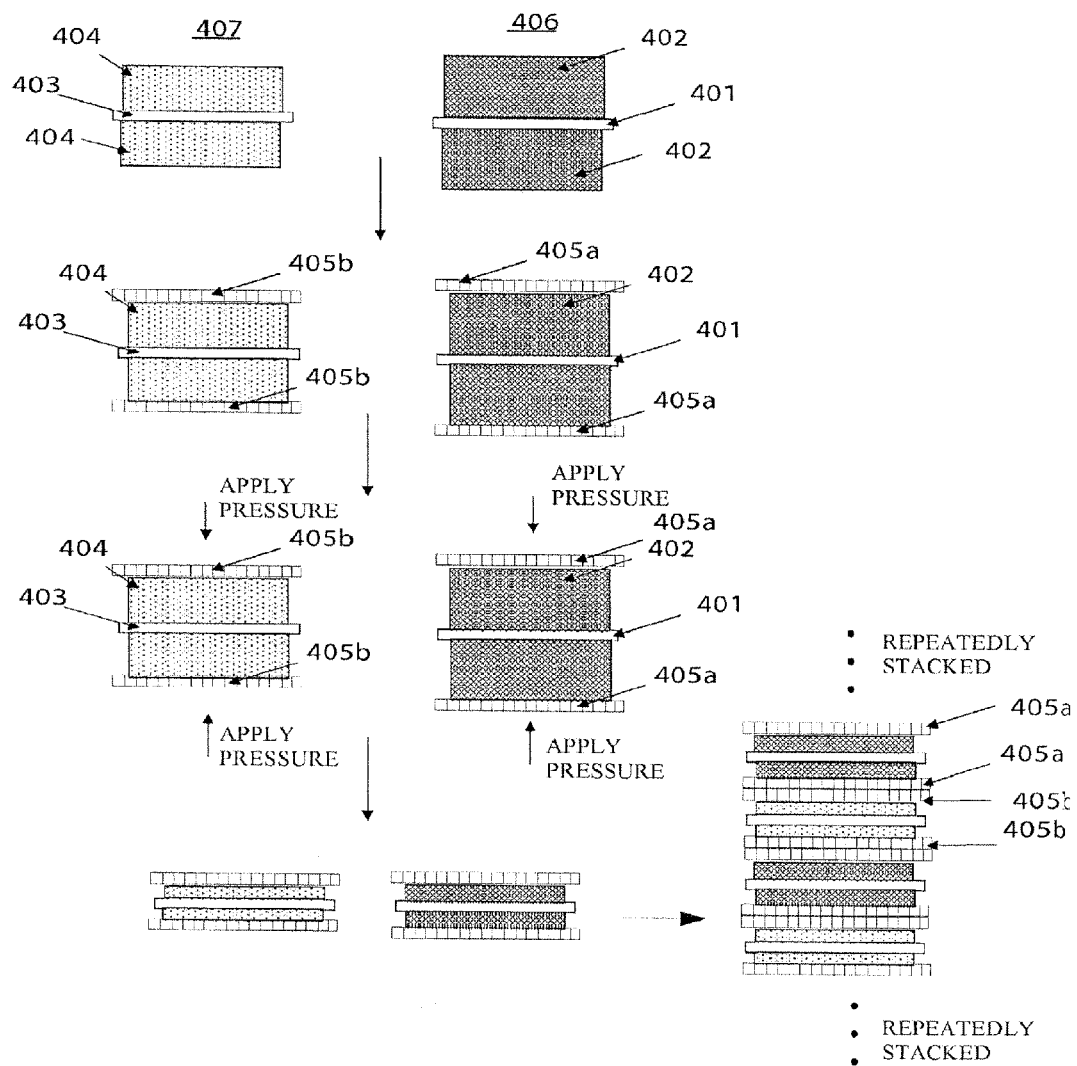

ELECTRIC DOUBLE LAYER CAPACITOR AND METHOD FOR MANUFACTURING THE SAME

RELATED APPLICATIONS

This application is the U.S. National Phase under 35 U.S.C. §371 of International Application No. PCT/JP2009/005898, filed on Nov. 6, 2009, which in turn claims the benefit of Japanese Application No. 2008-312358, filed on Dec. 8, 2008, the disclosures of which Applications are incorporated by reference herein.

TECHNICAL FIELD

The present invention relates to an electric double layer capacitor utilizing electrically-conductive fine fibers, such as carbon nanotubes, and a method for manufacturing the electric double layer capacitor.

BACKGROUND ART

In recent years, fine fibers, such as nanowires, nanotubes, and nanohorns, have been studied intensely. As a material forming the nanowires, silver, silicon, gold, copper, zinc oxide, titanium oxide, gallium nitride, or the like have been studied. For example, carbon nanotubes are known as the nanotubes, and carbon nanohorns are known as the nanohorns.

The carbon nanotube that is most promising as an electrically-conductive material is formed such that a graphite sheet is rounded to have a cylindrical shape. Then, the material has a hollow structure having a diameter of about 0.7 to 100 nm and a length of several micrometers to several millimeters. An electrical property of the carbon nanotube depends on the diameter and chirality and shows a metal-like property or a semiconductor-like property. Further, since the carbon nanotube does not have a dangling bond, it is chemically stable. Moreover, since the carbon nanotube is formed only by carbon atoms, it attracts attention as a material which is low in environmental load.

Since the carbon nanotube has the above physical properties, it is expected as an electron emitting source of a flat panel display, an electrode material of a lithium battery, and an electrode material of an electric double layer capacitor, or it is expected to be applied to a probe.

The carbon nanotube may be synthesized by arc discharge using a carbon electrode, thermal decomposition of benzene, laser deposition, or the like. However, graphite is synthesized in addition to the carbon nanotube by these methods. Therefore, in the case of applying the carbon nanotube to the electron source, the electrode of the battery, the probe, or the like, impurities, such as graphite and carbon nanoparticles, need to be removed in advance. Moreover, since the carbon nanotubes having various lengths are synthesized in random directions, the properties thereof as the electron emitting source are limited.

In recent years, a method for directly synthesizing oriented carbon nanotubes was presented. For example, a method for obtaining single-wall nanotubes densely and vertically oriented on a Si wafer by using plasma CVD has been developed. In accordance with this method, it is possible to obtain the carbon nanotubes in which the impurities, such as the graphite and the carbon nanoparticles, are small in amount and the directions of the fibers are the same as one another. With this, the manufactured carbon nanotubes are easily applied to the electron sources, the electrodes of the batteries, the probes, and the like.

Moreover, research development for applying the carbon nanotube to the electrode of the electric double layer capacitor by utilizing the size of a surface area has been intensely studied. Further, there exists an example in which the carbon nanotubes grown vertically on the surface of a current collector using the above-described technology are used as the electrodes.

The electric double layer capacitor is a condenser utilizing an electric double layer formed between an active material and an electrolytic solution. The electric double layer capacitor has been used as a backup power supply, and it is recently adopted in electric cars. Thus, future rapid growth of the electric double layer capacitor is expected. As a conventional active material of the electric double layer capacitor, activated carbon is widely known (see PTL 1, for example). However, since the carbon nanotube has much larger external surface area of 2,600 to 3,000 $m^2/g$ than the activated carbon and has, for example, an extremely strong mechanical property and an excellent electronic property, the electric double layer capacitor using the carbon nanotube as the active material is attracting attention.

The electric double layer capacitor is different in operating principle from a battery utilizing an oxidation-reduction reaction. The electric double layer capacitor is a power storing device configured to be charged and discharged by the adsorption and desorption of the positive ions and negative ions of an electrolytic solution onto the surface of the active material. Since the electric double layer capacitor is free of chemical reactions, it is more excellent than the battery. For example, the electric double layer capacitor has a long life, measurement of remaining electric charge is easy, and the environmental load is low.

FIG. 11 shows one example of the configuration of a common electric double layer capacitor in order to explain an electric operating principle. An electric double layer capacitor 1100 includes a positive electrode 1111 and a negative electrode 1112. The positive electrode 1111 includes a current collector 1107 and an active material layer 1108 formed on the current collector. The negative electrode 1112 includes a current collector 1104 and an active material layer 1105 formed on the current collector. The positive electrode 1111 and the negative electrode 1112 are provided in an electrolytic solution 1106. By applying a voltage to each of the positive electrode 1111 and the negative electrode 1112 by a power supply 1101, an electric field is generated between the positive electrode 1111 and the negative electrode 1112. By the effect of the electric field, positive electric charge 1109 is generated inside the active material layer 1108 of the positive electrode 1111, so that negative ions 1110 are attracted to the positive electrode 1111. Moreover, negative electric charge 1103 is generated inside the active material layer 1105 of the negative electrode 1112, so that positive ions 1102 are attracted to the negative electrode 1112. Thus, electricity is stored. The electric field generated between the positive electrode 1111 and the negative electrode 1112 by the voltage application disappears by the adsorption of the negative ions 1110 onto the positive electrode 1111 and the adsorption of the positive ions 1102 onto the negative electrode 1112. Instead of this, electric double layers are respectively generated between the positive electrode 1111 and the negative ions 1110 and between the negative electrode 1112 and the positive ions 1102. The total of a potential difference between these two electric double layers becomes a potential difference between the electrodes.

An electrical equivalent circuit corresponding to FIG. 11 is shown in FIG. 12. As shown in FIG. 12, an electric double layer capacitor is configured such that two condensers 1202 and 1203 are serially connected to each other.

Electric charge Q stored in the condenser is commonly shown by Q=CV, where C denotes the capacitance of the condenser and V denotes the voltage difference. An energy E stored in the condenser is shown by $E=\frac{1}{2}CV^2$. Therefore, stored energy per unit volume of the active material is proportional to the capacitance of the condenser per unit volume of the active material. On this account, by increasing the density of the active material layer without decreasing the area where the ions adsorb, the stored energy per unit volume of the active material can be increased.

NPL 1 reports a carbon nanotube densification technology which achieves more than 0.6 g/cm$^3$ by a simple high-pressure press (1 to 10 t/cm$^2$ (98 to 980 MPa)) without almost decreasing the surface area and the electric capacitance.

CITATION LIST

Patent Literature

PTL 1: Japanese Examined Patent Application Publication No. 2-847

Non Patent Literature

NPL 1: "Interim Report 2006" by New Energy and Industrial Technology Development Organization, Nanotechnology Program, Carbon Nanotube Capacitor Development Project

SUMMARY OF INVENTION

Technical Problem

In accordance with the simple high-pressure press (FIG. 13) described in NPL 1, a carbon nanotube layer 1302 formed on a current collector 1301 is compressed by using retainer plates 1303 and 1304. However, under such high pressure, the carbon nanotube layer 1302 may be transferred to the retainer plate 1303 contacting the carbon nanotube layer 1302, and a part of carbon nanotube layers 1306 may be peeled off from the current collector 1301. Although remaining carbon nanotube layers 1305 achieve the densification, there are regions which are not covered with the carbon nanotube layer on the surface of the current collector. Therefore, an energy density of the entire electric double layer capacitor cannot be adequately increased.

The present invention was made in light of the above circumstances, and an object of the present invention is to provide an electric double layer capacitor which uses an electrically-conductive fine fiber, such as a carbon nanotube, as an active material and whose energy density is increased by densely compressing the active material, and a method for manufacturing the electric double layer capacitor.

Solution to Problem

To achieve the above object, an electric double layer capacitor of the present invention is configured such that a positive electrode, a separator, and a negative electrode stacked in this order are contained in a container, and a portion between the positive electrode and the negative electrode is filled with an electrolytic solution, wherein: a polar plate of one or each of the positive electrode and the negative electrode includes a current collector and a plurality of electrically-conductive fine fibers formed and standing on a surface of the current collector such that one end of each of the fine fibers is electrically connected to the surface of the current collector; a surface of the polar plate is covered with the separator, the surface corresponding to the surface of the current collector; and the polar plate and the separator are pressure bonded to be integrated with each other.

Moreover, a method for manufacturing an electric double layer capacitor of the present invention is a method for manufacturing an electric double layer capacitor configured such that a positive electrode, a separator, and a negative electrode stacked in this order are contained in a container, and a portion between the positive electrode and the negative electrode is filled with an electrolytic solution, including: a preparing step of preparing a separator and a polar plate including a current collector and a plurality of electrically-conductive fine fibers formed and standing on a surface of the current collector such that one end of each of the fine fibers is electrically connected to the surface of the current collector; a covering step of covering a surface of the polar plate with the separator, the surface corresponding to the surface of the current collector, to form a stack body including the polar plate and the separator; a pressure bonding step of forming a pressure bonded stack body by applying pressure to the stack body from an upper side and a lower side to cause the polar plate and the separator to be pressure bonded to be integrated with each other; and an impregnating step of impregnating the pressure bonded stack body with an electrolytic solution.

Advantageous Effects of Invention

In accordance with the electric double layer capacitor of the present invention, since the polar plate and the separator are pressure bonded to be integrated with each other, the active material layer is compressed. Therefore, the active material layer formed by the electrically-conductive fine fibers is not transferred to a pressure member, and the density of the active material layer is increased. Thus, the energy density is increased.

Moreover, in accordance with the method for manufacturing the electric double layer capacitor of the present invention, such electric double layer capacitor can be easily manufactured.

BRIEF DESCRIPTION OF DRAWINGS

FIG. 15 is a schematic diagram showing a modification example of FIG. 4.

DESCRIPTION OF EMBODIMENTS

Hereinafter, embodiments of the present invention will be explained in detail.

Figure 2:
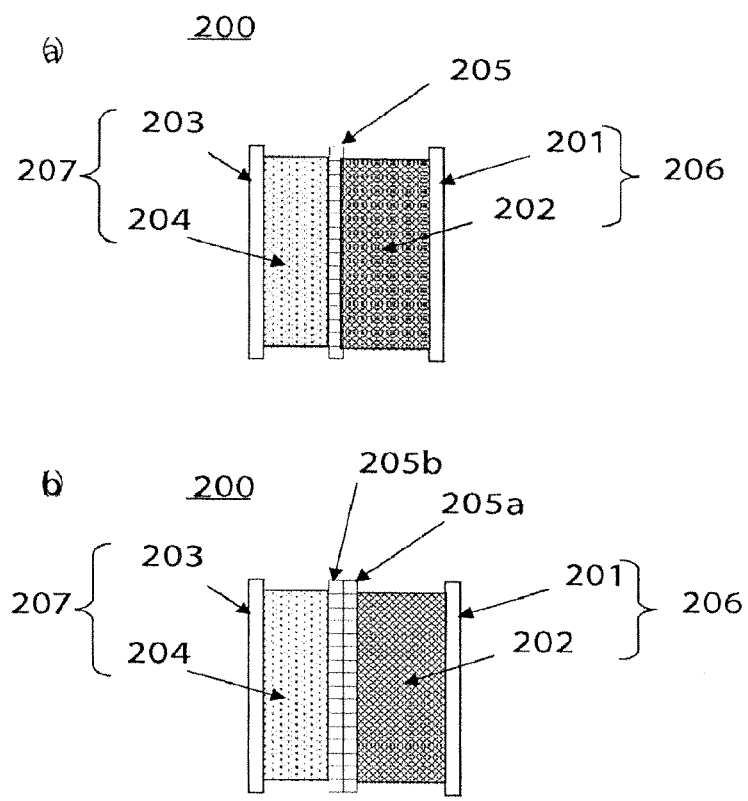
FIG. 2 is a conceptual diagram of an electric double layer capacitor of an embodiment of the present invention.

FIG. 2(a) is a conceptual diagram of an electric double layer capacitor of an embodiment of the present invention. As shown in FIG. 2, an electric double layer capacitor 200 includes a separator 205, a positive electrode 206, and a negative electrode 207. The positive electrode 206 and the negative electrode 207 are arranged to be opposed to each other via the separator 205. The positive electrode 206 includes a current collector 201 and a plurality of fine fibers 202 standing on the current collector 201. The negative electrode 207 includes a current collector 203 and a plurality of fine fibers 204 standing on the current collector 203. The separator 205 has one surface contacting the fine fibers 202 and the other surface contacting the fine fibers 204. In the present embodiment, the separator 205, the positive electrode 206, and the negative electrode 207 are pressure bonded to be integrated with one another. In accordance with the present embodiment, since the number of separators is only one, resistance of the electric double layer capacitor can be reduced.

FIG. 2(b) showing another embodiment is different from FIG. 2(a) in that there exists two separators 205a and 205b. The positive electrode separator 205a opposed to the positive electrode 206 is stacked on the positive electrode 206 so as to contact the fine fibers 202, and these are pressure bonded to be integrated with one another. The negative electrode separator 205b opposed to the negative electrode 207 is stacked on the negative electrode 207 so as to contact the fine fibers 204, and these are pressure bonded to be integrated with one another. These two pressure bonded stack bodies overlap each other such that two separators 205a and 205b contact each other. In the present embodiment, since only one surface of each separator contacts the fine fibers, risk of the occurrence of short-circuit can be reduced.

Each of the current collectors 201 and 203 is a plate-shaped member made of an electrically-conductive material. Examples of the electrically-conductive material are silicon, stainless steel, iron, aluminum, nickel, titanium, and copper. However, the electrically-conductive material is not limited to these. Among these, aluminum is used as the current collector of the electric double layer capacitor using activated carbon as the active material, and aluminum can be especially preferably used in the present invention. This is because since a thin passivation film is formed on the surface of aluminum, aluminum is not eluted even by high voltage application.

Each of the separators 205, 205a, and 205b is disposed between the positive electrode and the negative electrode to separate these electrodes from each other, holds the electrolytic solution, and secures ion conductivity between the positive electrode and the negative electrode. Examples of the material constituting the separator are organic materials, such as cellulose, polypropylene, polytetrafluoroethylene, polyolefin, fluorine-containing resin, acryl resin, polyamide resin, nylon, polyester, polycarbonate, sulfonic acid group-containing resin, and phenol resin, and inorganic materials, such as glass fiber. However, the material constituting the separator is not limited to these. The electric double layer capacitor of the present invention can be manufactured such that a polar plate including a current collector and fine fibers and a separator are separately prepared, are stacked, and are pressure bonded. Therefore, the electric double layer capacitor of the present invention is easily manufactured even if the separator is made of a material other than thermosetting resin. In the present invention, a commercially available separator can be used as the separator of the electric double layer capacitor.

It is preferable that each of the fine fibers 202 and the fine fibers 204 have a diameter of 0.1 to 100 nm. By using the fine fibers 202 and the fine fibers 204 whose diameters are within the above range, the fine fibers 202 can be densely formed and stand on the current collector 201, and the fine fibers 204 can be densely formed and stand on the current collector 203. Thus, the electric double layer capacitor having high energy density can be formed. Examples of the fine fibers 202 and the fine fibers 204 are nanowires which are made of silver, gold, or copper, carbon nanotubes, carbon nanohorns, and activated carbon fibers. However, the fine fibers 202 and the fine fibers 204 are not limited to these. Among these, the carbon nanotubes are preferable because of easiness of orientation synthesis.

The carbon nanotube is an ultrafine tubular substance formed by coupling carbon atoms in a net-like pattern and having a nanometer-size hole diameter. In the case of using the carbon nanotube, the carbon nanotube may be a single-layer tube, that is, a single tube, or may be a multi-layer tube, that is, a tube formed by a plurality of concentric tubes having different diameters from one another. The diameter of the carbon nanotube is not limited. However, in the case of using the carbon nanotube in the electrode of the electric double layer capacitor, lithium ions each having an ion radius of 0.074 nm and electrolyte ions each having an ion radius of about 0.5 nm may get into the inside of the carbon nanotube. Therefore, it is preferable that the hole diameter of the carbon nanotube be in a range from 0.1 to 10 nm, and it is further preferable that the hole diameter of the carbon nanotube be in a range from 0.1 to 3 nm.

In the electric double layer capacitor, a portion between the positive electrode and the negative electrode is filled with the electrolytic solution, and the electrolytic solution is held by the separator. A solution prepared by using a solvent and an electrolytic solution can be used as the electrolytic solution. The solvent of the electrolytic solution is not especially limited. However, one selected from propylene carbonate, ethylene carbonate, butyl carbonate, γ-butyrolactone, γ-valerolactone, N-methyl-2-pyrrolidone, N,N-dimethylformamide, 1,3-dimethyl-2-imidazolidinone, N,N-dimethylacetamide, acetonitrile, propionitrile, tetrahydrofuran, dimethyl carbonate, diethyl carbonate, ethyl methyl carbonate, sulfolan, and dimethyl sulfoxide may be used as the solvent of the electrolytic solution, or a combination of a plurality of compounds selected from the above compounds may be used as the solvent of the electrolytic solution.

An electrolyte of the electrolytic solution is not especially limited. However, for example, one selected from tetrafluoroboric acid tetraethylammonium, tetrafluoroboric acid triethylmethylammonium, triethylmethylammonium bis, hexafluorophosphate tetraethylammonium, and tetraethylammonium bis may be used as the electrolyte of the electrolytic solution, or a combination of a plurality of compounds selected from the above compounds may be used as the electrolyte of the electrolytic solution.

Moreover, as the electrolytic solution, one selected from an imidazolium-based ionic liquid, a pyridinium-based ionic liquid, an aliphatic-based ionic liquid, a pyrrolidinium-based ionic liquid, an ammonium-based ionic liquid, a phosphonium-based ionic liquid, and a sulfonium-based ionic liquid may be used, or a combination of a plurality of compounds selected from the above compounds may be used.

In the electric double layer capacitor, the electric charge Q stored in the condenser is commonly shown by $Q=CV$, where C denotes the capacitance of the condenser, and V denotes the voltage difference. Further, the energy E stored in the condenser is shown by $E=\frac{1}{2}CV^2$. The capacitance (F/cm$^3$) per unit volume is proportional to the density of the active material. Therefore, in the electrode in which the active material is the fine fiber, the density and the capacitance are thought to be proportional to each other as long as the surface area of the active material does not change. Therefore, the energy (energy density) per unit volume is thought to increase by increasing the density of the active material layer. In a case where the fine fibers are formed and stand on the current collector, a maximum density of a fine fiber layer achieved by synthesis does not necessarily become an ideal maximum density (density by which the surface area per unit volume for the adsorption and desorption of ions becomes maximum) of the active material layer. In order to set the density to be close to the ideal maximum density, the compression is performed with the separator stacked on the fine fiber layer in the present invention, so that the density of the fine fiber layer is increased, and the polar plate and the separator are pressure bonded to be integrated with each other. With this, since the density of the fine fiber layer can be increased without causing problems, such as the peel-off of the fine fiber layer, the energy density of the electric double layer capacitor can be increased. Moreover, since the polar plate and the separator are integrated with each other, handling is easy when these are accommodated in a container.

In the electric double layer capacitor of the present invention, the separator and the current collector are pressure bonded to be integrated with the active material layer made of the fine fibers and interposed therebetween. The term "pressure bond" used herein means that the separator and the polar plate are fixed to each other without an adhesive, and specifically denotes a state where a stress of more than $2.5 \times 10^4$ Pa is required to separate the separator and the polar plate from each other. In conventional electric double layer capacitors, since the separator and the polar plate are not pressure bonded and are not integrated with each other, the separator and the polar plate are easily separated from each other by the application of the stress of less than $2.5 \times 10^4$ Pa.

Figure 1:
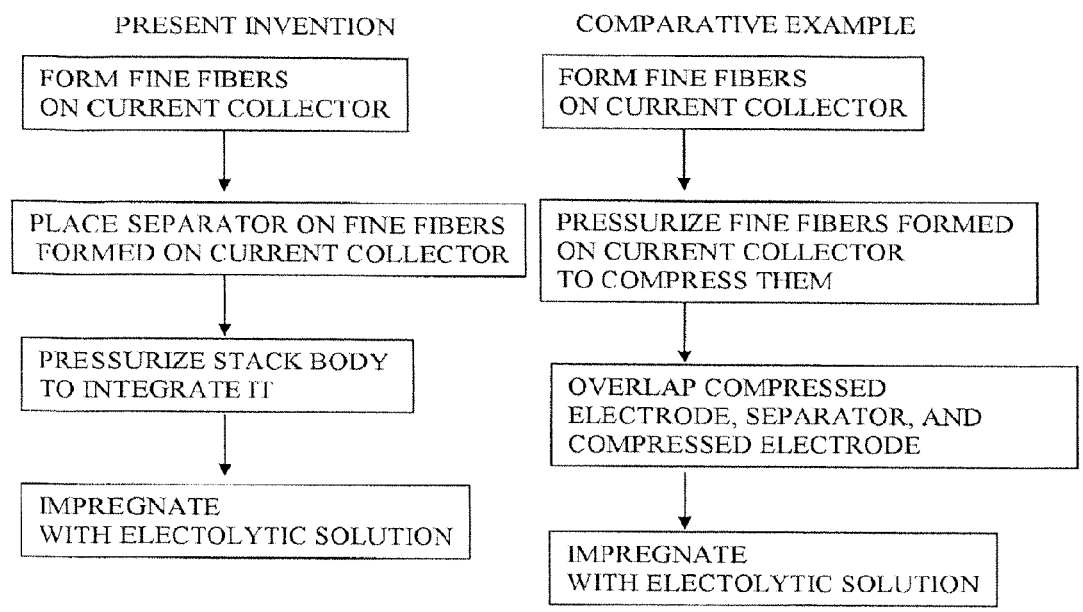
FIG. 1 shows a flow of steps of a manufacturing method of the present invention and a flow of steps of a manufacturing method of Comparative Example.

Next, a method for manufacturing the electric double layer capacitor of the present embodiment will be explained. For comparison, FIG. 1 shows the flow of steps of the manufacturing method of the present invention and the flow of steps of the manufacturing method of Comparative Example.

In a preparing step of the manufacturing method of the present invention, two polar plates (a positive electrode and a negative electrode) and a separator are prepared. One or each of the polar plates includes a current collector and a plurality of electrically-conductive fine fibers formed and standing on one or both of surfaces of the current collector such that one end of each of the fine fibers is electrically connected to the surface.

As the fine fiber, the above-described various materials can be used. The following will explain a method for forming a plurality of carbon nanotubes as the fine fibers standing on the surface of the current collector.

The carbon nanotubes can be formed by a transfer method. However, a method for directly synthesizing the carbon nanotubes on the current collector is preferable since highly oriented carbon nanotubes can be obtained. In this case, the carbon nanotubes are synthesized via catalyst metal particles adhered to the surface of the current collector.

Examples of the catalyst are metals, such as nickel, iron, cobalt, zinc, molybdenum, gold, silver, and copper, alloys of the above metals, oxides of the above metals, and carbides of the above metals. The catalyst may be suitably selected depending on a desired carbon nanotube diameter and its synthetic method.

The catalyst metal particles increase in size by heating at the time of the carbon nanotube synthesis or preheating before the synthesis. Here, the catalyst metal particle diameter and the synthesized carbon nanotube diameter are thought to be correlated. Therefore, in a case where the desired carbon nanotube diameter is 1 to 100 nm, it is desirable that the catalyst metal particle diameter be adjusted to 1 to 100 nm.

Examples of the method for directly synthesizing the carbon nanotubes standing on the current collector are chemical vapor deposition (CVD), laser ablation, arc discharge, and electrolytic synthesis in solution. In the present invention, the CVD is preferable. Two major kinds of the CVD are thermal CVD by which a material gas is thermally decomposed and plasma CVD by which the material gas is decomposed by plasma. The carbon nanotubes can be synthesized by the CVD at a temperature of 550° C. to 750° C. and under pressure of 200 Pa. A hydrocarbon-based gas, such as methane, ethylene, or acetylene, or an alcohol, such as methanol, is supplied to a chamber as a carbon source, and the carbon source is directly decomposed on the current collector on which the catalyst metal particles are mounted. Thus, the carbon nanotubes are synthesized. Further, as a carrier gas of the carbon source, a gas, such as argon, nitrogen, or hydrogen, may be used. A growth time of the carbon nanotube is controlled in accordance with the desired length of the carbon nanotube. Since a growth rate changes depending on a growth temperature, gas pressure, and the type of the carbon source to be used, the growth time depends on conditions. However, within the above conditions, in order to grow the carbon nanotube having the length of 100 μm for example, the growth time can be set to about 10 minutes to four hours.

After the preparing step, a covering step is carried out. In the covering step, the separator covers the surface (surface on which the fine fibers stand) of the polar plate. Thus, the stack body including the polar plate and the separator is formed.

Next, a pressure bonding step is carried out. Here, pressure is applied from an upper side and a lower side to the stack body obtained in the covering step. A method for applying the pressure is not especially limited. Examples of the method are a method for sandwiching the stack body between plates to press the stack body and a method for sandwiching the stack body between rollers to press the stack body.

The pressure in the pressure bonding step is not especially limited. However, if the pressure is too low, for example, the density of the active material layer becomes 0.5 g/cm² or lower, so that the effect of the energy density improvement cannot be adequately achieved. In contrast, if the pressure is too high, the separator breaks in the pressure bonding step, so that the short-circuit problem tends to occur. In consideration of these circumstances, the pressure in the compressing step can be suitably determined. Specifically, it is preferable that the pressure be not lower than 30 MPa and not higher than 70 MPa.

It is preferable that when applying the pressure, a buffer, such as rubber, be disposed on each of both surfaces of the stack body such that the pressure is uniformly applied to the entire polar plate.

In the present invention, by carrying out the pressure bonding step, the polar plate and the separator are pressure bonded to be integrated with each other. In the present invention, the active material layer is formed by the standing fine fibers. Therefore, in a case where the separator is made of a fiber-like material, such as cellulose, the fine fibers may get into the separator by the pressure application and entwine with the fiber-like material, so that the polar plate and the separator are thought to be able to be physically fixed to each other. Moreover, in a case where the separator is formed by a sheet of, for example, an organic material, the fine fibers may stick in the sheet by the pressure application, so that the polar plate and the separator are thought to be able to be physically fixed to each other. Moreover, the activated carbon is not formed by the fine fibers, so that even if the polar plate using the activated carbon as the active material and the separator overlap each other and extremely high pressure (100 MPa or more, for example) is applied to the polar plate and the separator to compress them, the activated carbon and the separator are not pressure bonded.

By this compressing step, the density of the active material layer increases, and the distance between the positive electrode and the negative electrode becomes shorter than a case where the compressing step is not carried out. Therefore, the resistance becomes low, and output density improves.

Figure 3:
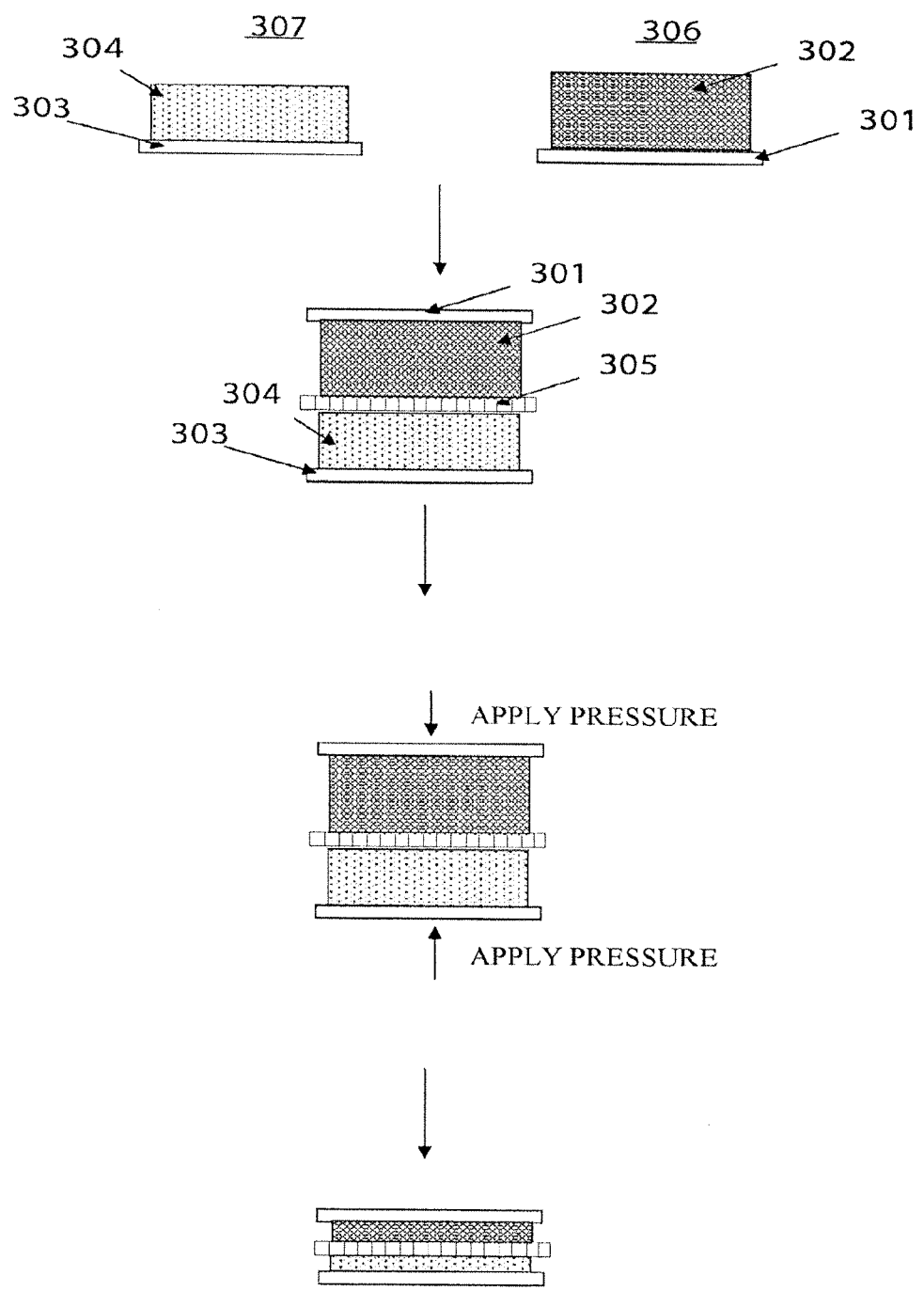
FIG. 3 is a schematic diagram showing a covering step and a compressing step when manufacturing the electric double layer capacitor having the configuration of FIG. 2(a).
Figure 14:
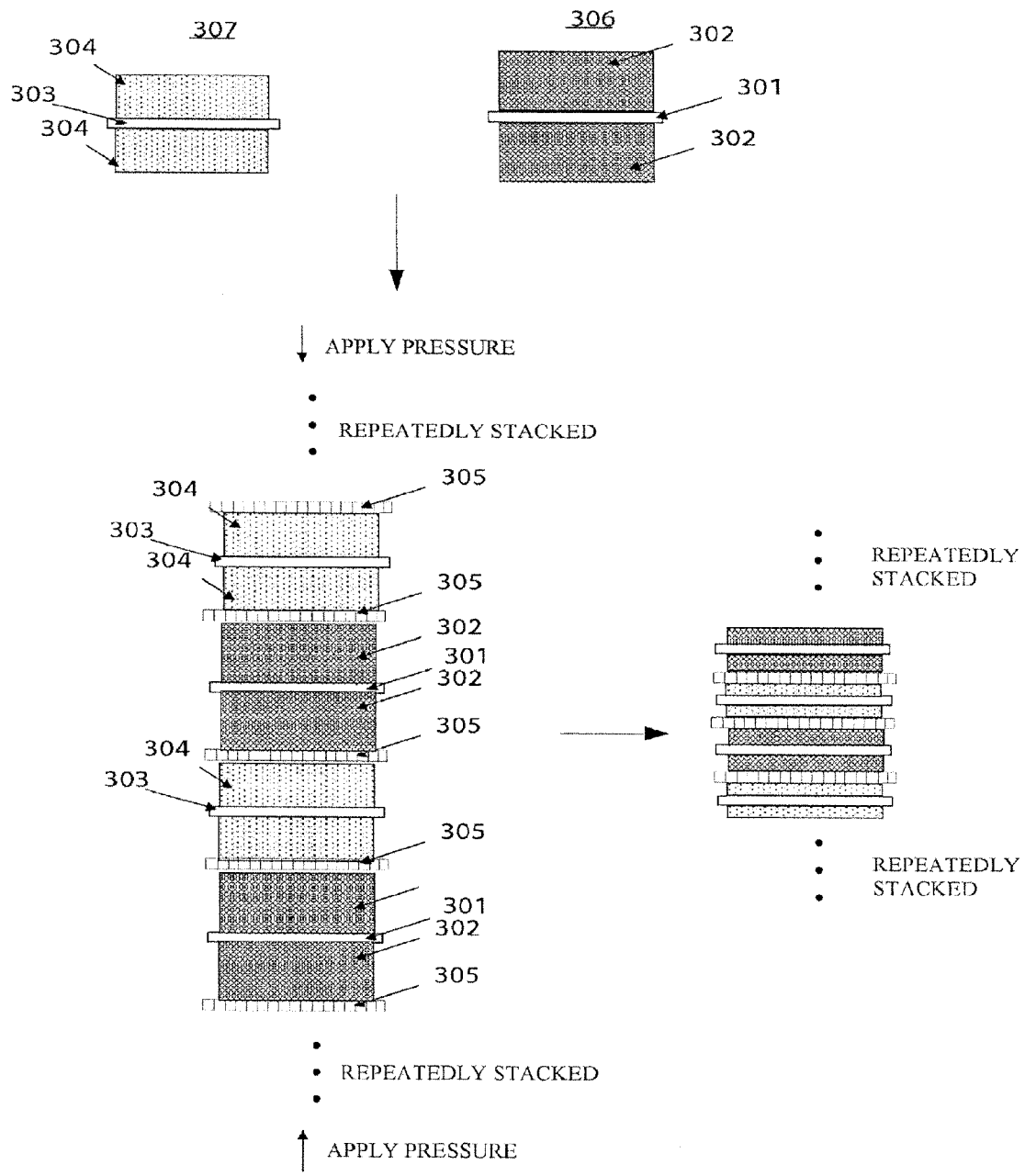
FIG. 14 is a schematic diagram showing a modification example of FIG. 3.

FIG. 3 schematically shows the covering step and the compressing step when manufacturing the electric double layer capacitor having the configuration of FIG. 2(a). Here, a positive electrode 306 and a negative electrode 307 are stacked with a separator 305 interposed therebetween, and then compressed. FIG. 14 shows a modification example of FIG. 3 and shows an example in which each of a plurality of positive electrodes and a plurality of negative electrodes is manufactured by forming the fine fibers on both surfaces of the current collector, and the positive electrodes and the negative electrodes are alternately stacked on one another with the separator interposed therebetween and then compressed.

Figure 4:
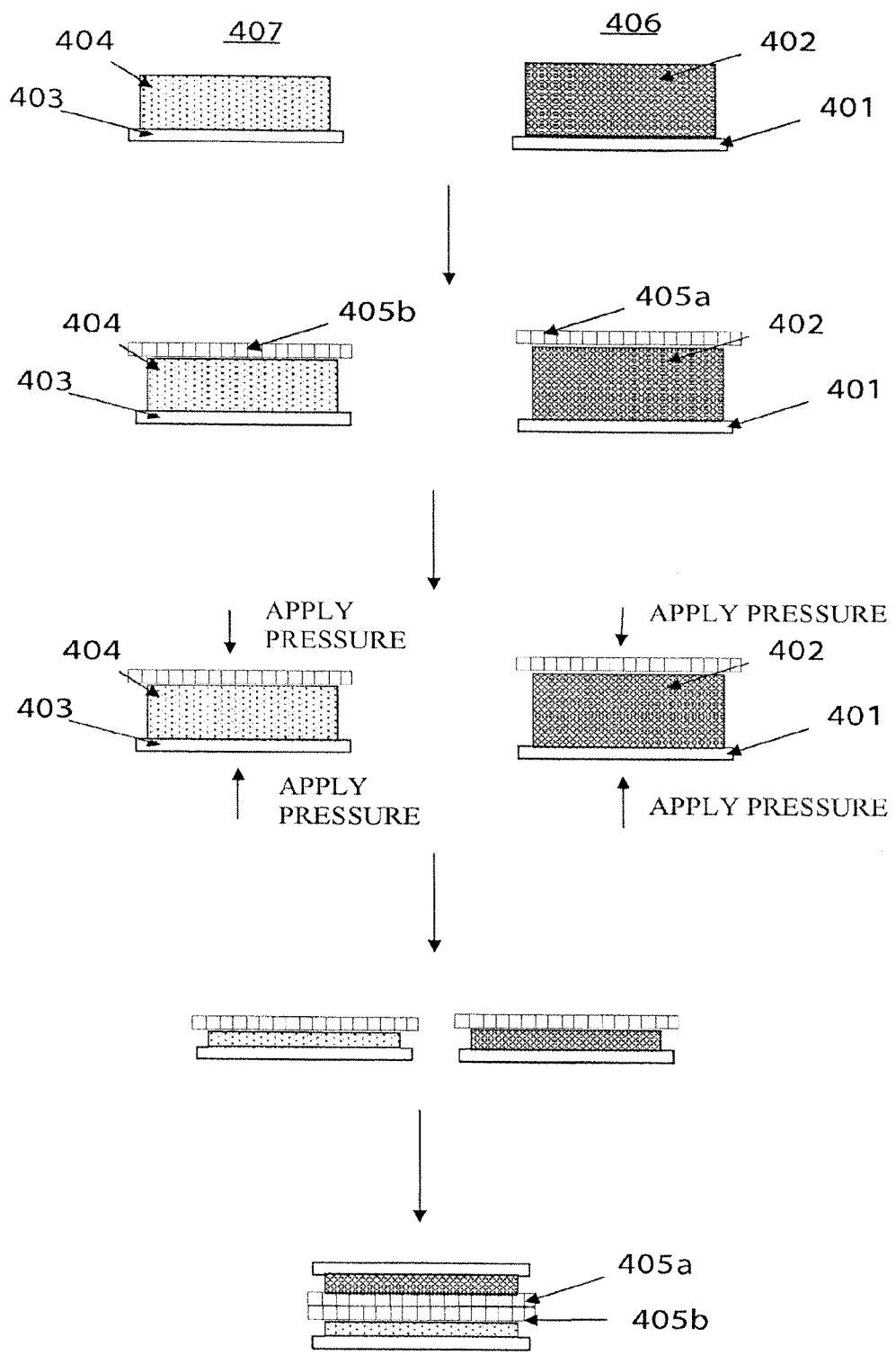
FIG. 4 is a schematic diagram showing the covering step and the compressing step when manufacturing the electric double layer capacitor having the configuration of FIG. 2(b).

FIG. 4 schematically shows the covering step and the compressing step when manufacturing the electric double layer capacitor having the configuration of FIG. 2(b). Here, a positive electrode 406 and a positive electrode separator 405a are stacked and compressed, and a negative electrode 407 and a negative electrode separator 405b are stacked and compressed. The obtained two pressure bonded stack bodies overlap each other such that the separators thereof contact each other. FIG. 15 shows a modification example of FIG. 4 and shows an example in which: a plurality of compressed stack bodies are formed such that the fine fibers are formed on both surfaces of the current collector, and the separators respectively cover both surfaces of the polar plate and are then compressed; and the compressed stack bodies alternately overlap one another.

The pressure bonded stack body obtained as above is impregnated with the electrolytic solution, and is finally stored in a container. Thus, the electric double layer capacitor can be formed.

In the manufacturing method of the present invention, it is preferable that a pre-pressurizing step of inclining the fine fibers be carried out before the covering step. In this step, weak pressure which is lower than the pressure in the pressure bonding step and by which the fine fibers are not peeled off is applied to the fine fibers on the current collector. By carrying out this step, the fine fibers can be caused to lay down in a certain direction in the pressure bonding step of carrying out pressure bonding and integrating by high pressure. Moreover, in the pre-pressurizing step, the fine fibers are inclined in a direction that is not perpendicular to the current collector. With this, it is possible to prevent the fine fibers from breaking through the separator in the pressure bonding step to cause short-circuit between both electrodes.

The material of a pressurizing plate contacting the fine fibers when carrying out the pre-pressurizing is not especially limited. However, in order to prevent the fine fibers from being transferred, it is preferable to use a material having a smooth surface. Specific examples are glass, alumina, and silicon wafer.

The pressure in the pre-pressurizing step may be suitably determined in consideration of the above object. It is preferable that the pressure in the pre-pressurizing step be not lower than 2.5 MPa and not higher than 5 MPa.

Figure 5:
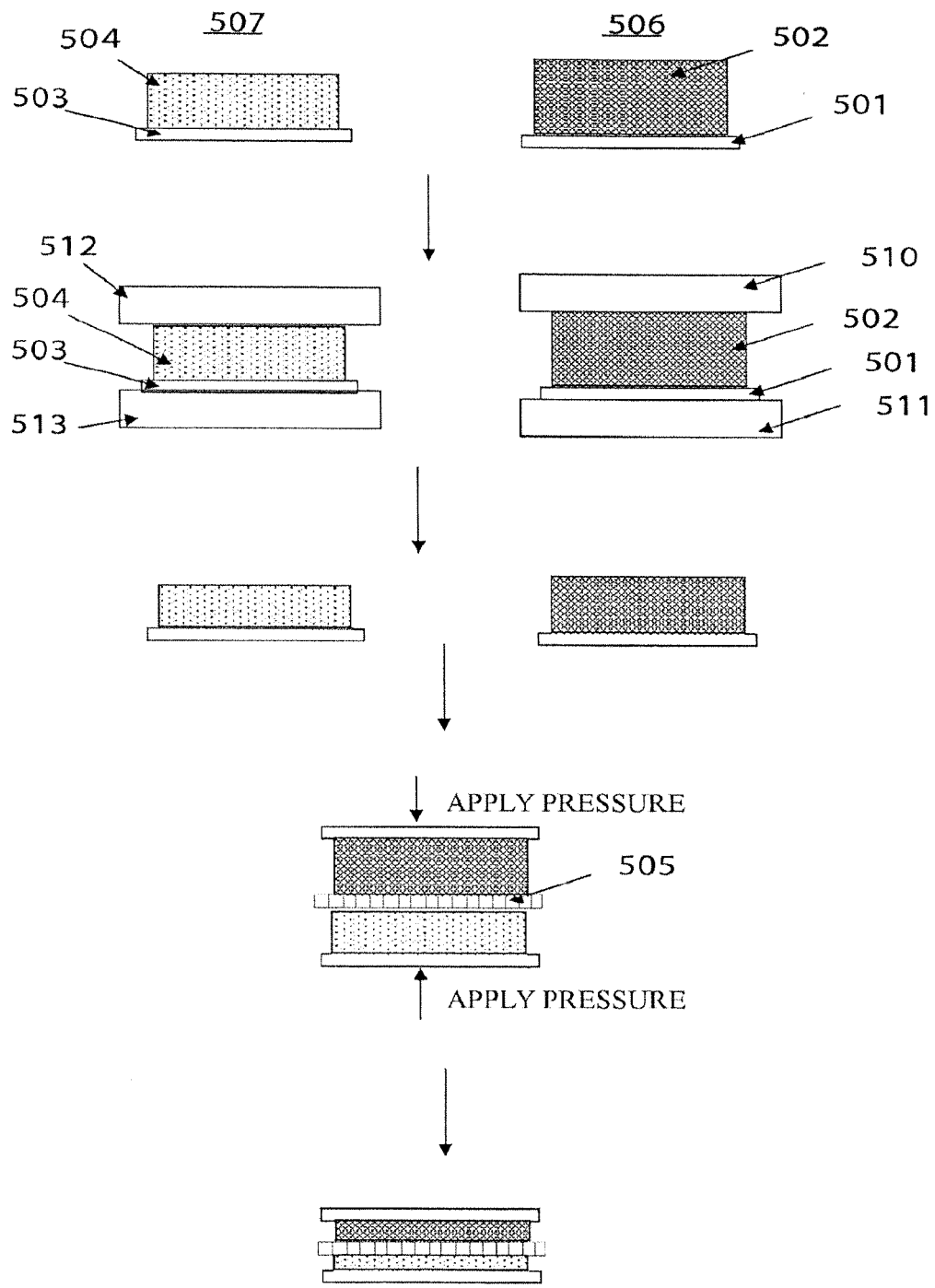
FIG. 5 is a schematic diagram showing a pre-pressurizing step, the covering step, and the compressing step when manufacturing the electric double layer capacitor having the configuration of FIG. 2(a).

FIG. 5 schematically shows the pre-pressurizing step, the covering step, and the compressing step when manufacturing the electric double layer capacitor having the configuration of FIG. 2(a). Regarding a positive electrode 506, a pre-pressurizing plate 510 is placed on fine fibers 502, and the fine fibers 502 are weakly compressed by applying the pressure to the fine fibers 502 between the pre-pressurizing plate 510 and a pre-pressurizing plate 511. Similarly, regarding a negative electrode 507, a pre-pressurizing plate 512 is placed on fine fibers 504, and the fine fibers 504 are weakly compressed by applying the pressure to the fine fibers 504 between the pre-pressurizing plate 512 and a pre-pressurizing plate 513. Then, the positive electrode 506 and the negative electrode 507 are stacked on each other with a separator 505 interposed therebetween, and the pressure bonding step is carried out.

Figure 6:
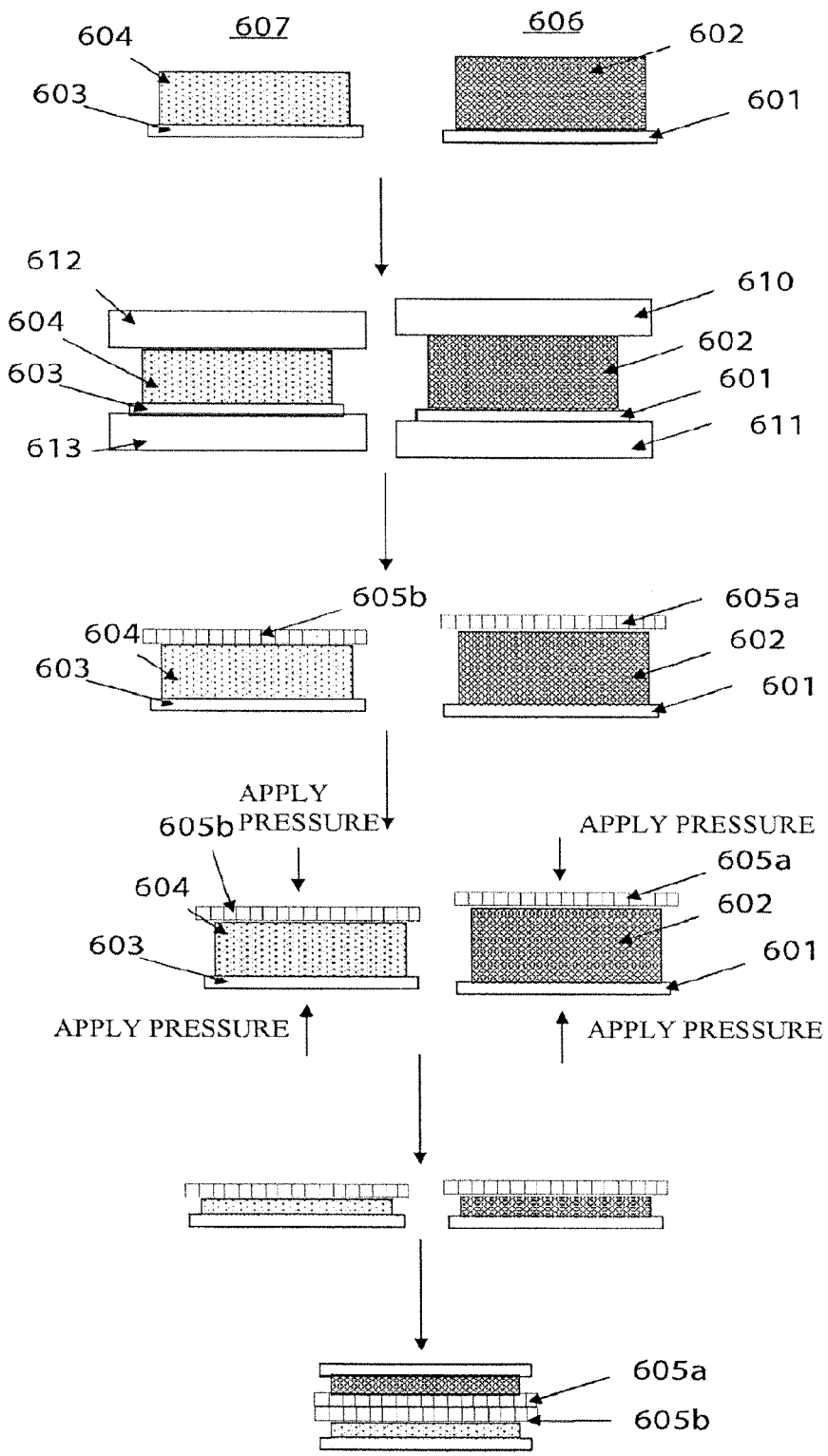
FIG. 6 is a schematic diagram showing the pre-pressurizing step, the covering step, and the compressing step when manufacturing the electric double layer capacitor having the configuration of FIG. 2(b).

FIG. 6 schematically shows the pre-pressurizing step, the covering step, and the compressing step when manufacturing the electric double layer capacitor having the configuration of FIG. 2(b). As with the above, after a positive electrode 606 and a negative electrode 607 are weakly compressed, these electrodes are respectively covered with separators 605a and 605b. Then, the pressure bonding step is carried out. The obtained two pressure bonded stack bodies are stacked on each other to constitute the electric double layer capacitor.

EXAMPLES

Hereinafter, the present invention will be explained in further detail using Examples and Comparative Examples. However, the present invention is not limited to these Examples.

Comparative Example 1

In Comparative Example 1, a method for directly compressing the fine fibers standing on the surface of the current collector without stacking the separator was carried out in accordance with Comparative Example of FIG. 1. The carbon nanotubes were used as the fine fibers.

First, an electric double layer capacitor aluminum plate having a size of 7 mm×14 mm and a thickness of 300 μm was prepared and cleaned. A cleaning liquid prepared by dissolving DK Be Clear (produced by Dai-Ichi Kogyo Seiyaku Co., Ltd.) in pure water at a concentration of 3 wt % was maintained at 40° C., and the current collector was immersed in this liquid. Thus, the current collector was cleaned. The current collector was immersed in the cleaning liquid for five minutes and was then rinsed for five minutes using pure water in an ultrasound bath. The rinsing was repeated three times. After the rinsing, $N_2$ blow was carried out to dry the current collector.

In order to form a catalyst metal layer on the current collector, the current collector is placed and set in an EB deposition device, and Al having a thickness of 3 nm as a catalyst material was deposited, and Fe having a thickness of 1 nm was further deposited on Al. The degree of vacuum before the deposition was $1.2 \times 10^{-5}$ Pa. A deposition rate of each of Al and Fe was 1 nm/s. After the deposition of Fe, the current collector was subjected to a heat treatment at 300° C. for 30 minutes in a vacuum to form catalyst metal particles. At this stage, the diameter of the catalyst metal particle measured by AFM was an average of 2.9 nm.

Next, the carbon nanotubes were synthesized. The plasma CVD was used for the synthesis of the carbon nanotubes. A reactant gas was $CH_4$, and a carrier gas was hydrogen. The above-produced structure was set in a reactor, and vacuum drawing was carried out using a rotary pump and a turbo-molecular pump. The degree of ultimate vacuum was $5 \times 10^{-4}$ Pa. The pumps were stopped in this state, and hydrogen that was the carrier gas was supplied. The flow rate of hydrogen was 60 sccm. When the hydrogen gas was supplied and the pressure of the reactor became the atmospheric pressure, 10 sccm of $CH_4$ that was the carbon source was supplied while maintaining the atmospheric pressure in the reactor, and the heat treatment was started. The reaction temperature was 620° C., and the synthesis was carried out for 120 minutes. With this, the carbon nanotubes vertically oriented from the current collector and having the average length of 638 μm could be synthesized. By TEM observation, information, such as the diameter of the carbon nanotube, was obtained. A mixture of a single-wall carbon nanotube having a diameter of 3 nm and a double-wall carbon nanotube was confirmed.

The above-described aluminum plate on which the carbon nanotubes grew was prepared. A Si wafer was placed on the carbon nanotubes, and the carbon nanotubes were compressed by pressure by which the carbon nanotubes were not transferred to the Si wafer. Next, the Si wafer was placed on the carbon nanotubes, and these were compressed by pressure of 20 MPa using a press device. In this case, a part of the carbon nanotubes were transferred to the Si wafer.

Figure 7:
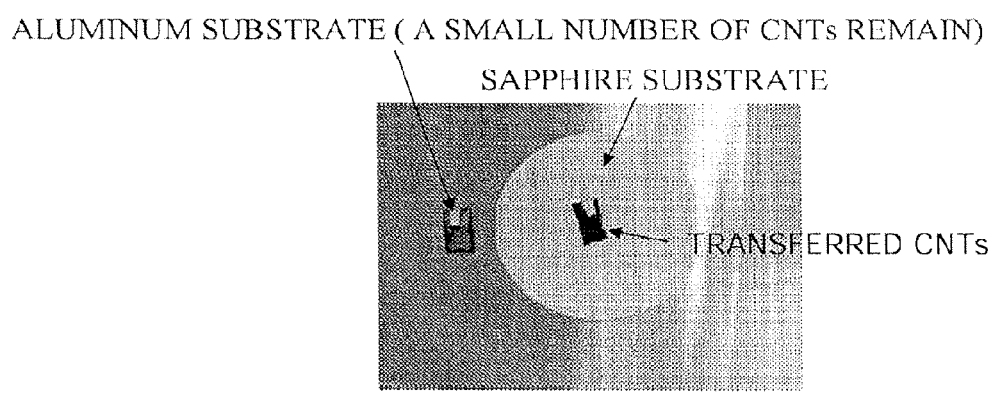
FIG. 7 is a photograph showing that fine fibers are transferred to a sapphire substrate by compression in Comparative Example 1.

The above-described aluminum plate on which the carbon nanotubes grew was prepared. A Si wafer was placed on the carbon nanotubes, and the carbon nanotubes were compressed by pressure by which the carbon nanotubes were not transferred to the Si wafer. Next, a sapphire substrate was placed on the carbon nanotubes, and these were compressed by pressure of 20 MPa using the press device. In this case, a part of the carbon nanotubes were transferred to the sapphire substrate. FIG. 7 is a photograph showing this state.

Figure 8:
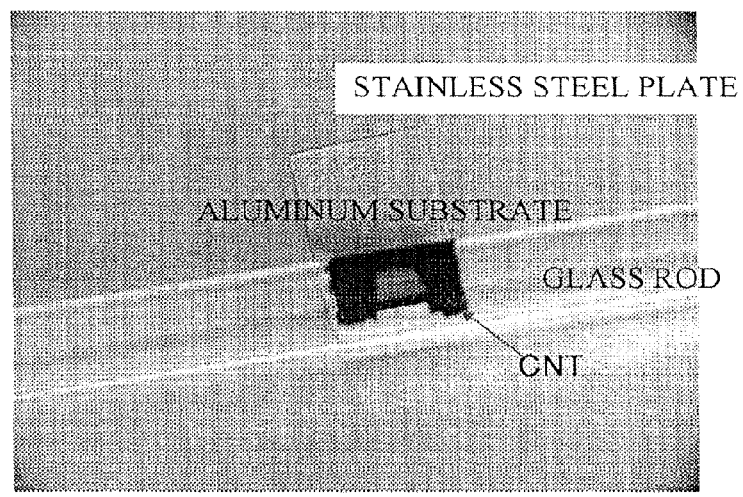
FIG. 8 is a photograph showing that the fine fibers are transferred to a glass plate by compression in Comparative Example 1.

The above-described aluminum plate on which the carbon nanotubes grew was prepared. A Si wafer was placed on the carbon nanotubes, and the carbon nanotubes were compressed by pressure by which the carbon nanotubes were not transferred to the Si wafer. Next, a glass rod having a diameter of 4 mm was prepared, and the glass rod was rolled while applying pressure to the carbon nanotubes. In this case, a part of the carbon nanotubes were transferred to the glass rod. FIG. 8 is a photograph showing this state.

In accordance with Comparative Example 1, it was found that since the carbon nanotubes were peeled off from the current collector by the method for directly compressing the carbon nanotubes by high pressure, the electrode for the electric double layer capacitor could not be manufactured.

Example 1

In Example 1, the separator was placed on the fine fibers standing on the surface of the current collector, and pressure is applied to the stack body including the polar plate and the separator. Thus, the electrode for the electric double layer capacitor was manufactured. The carbon nanotubes were used as the fine fibers.

The method for forming the carbon nanotubes on the current collector is the same as the method of Comparative Example 1, so that an explanation thereof is omitted.

The Si wafer was placed on the carbon nanotubes, and the carbon nanotubes were compressed by pressure (4 MPa) by which the carbon nanotubes were not transferred to the Si wafer.

Two current collectors were placed so as to sandwich a polypropylene separator having a thickness of 25 μm such that the carbon nanotubes formed on these two current collectors were opposed to each other. Then, these were pressurized by pressure of 50 MPa using the press device. In order to equally distribute the pressure, a rubber sheet was placed between each pressing plate of the press device and each of both current collectors, that is, the aluminum side. After the pressure application, the positive electrode, the separator, and the negative electrode are pressure bonded to be integrated with one another, and could not be separated easily. A stress necessary for the separation was measured using five samples, and the result was $2.5 \times 10^4$ to $5 \times 10^4$ MPa. In order to measure the stress, the positive electrode and the negative electrode were respectively fixed to stainless steel plates, and the stress was measured when the positive electrode and the negative electrode were separated from each other by the stress application using a spring scale. When the positive electrode and the negative electrode were separated from each other, a part of the carbon nanotubes were transferred to the separator.

Figure 9:
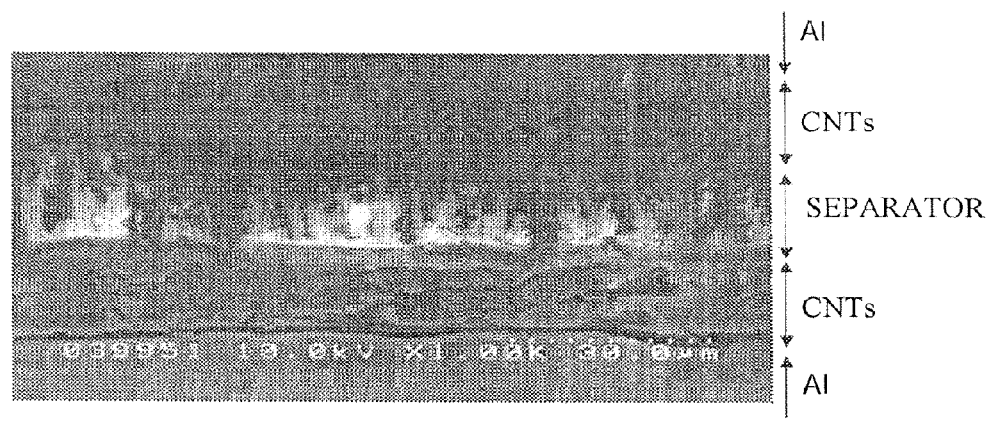
FIG. 9 is an electron micrograph showing a cross section of a pressure bonded stack body in Example 1.

The pressure bonded structure was cut and its cross section was observed with an electron microscope. An electron micrograph is shown in FIG. 9. The carbon nanotube having the thickness of 638 μm was compressed to 17 μm. The density of the carbon nanotube was 0.027 g/cm³ before the compression and became 1.0 g/cm³ after the compression. Moreover, the separator was compressed from 25 μm to 20 μm in thickness.

Moreover, the same results as above could be obtained even in a case where the separator was disposed on the carbon nanotubes standing on the surface of the current collector as above and these are compressed as above.

In accordance with Example 1, it was found that when the separator and the fine fibers overlap and are compressed, the fine fibers are densely compressed, and the electrode and the separator are pressure bonded to be integrated with each other.

Example 2

In Example 2, the electric double layer capacitor was manufactured by using the electric double layer capacitor electrode which was manufactured in Example 1 such that the positive electrode, the separator, and the negative electrode were pressure bonded to be integrated with one another.

The electric double layer capacitor electrode was immersed in the electrolytic solution. The electrolytic solution was prepared by dissolving tetrafluoroboric acid tetraethylammonium in propylene carbonate. The concentration of tetrafluoroboric acid tetraethylammonium was 0.7 mol/l. Next, the pressure was reduced to a level that the electrolytic solution did not boil, and the electrolytic solution permeated the active material.

Figure 10:
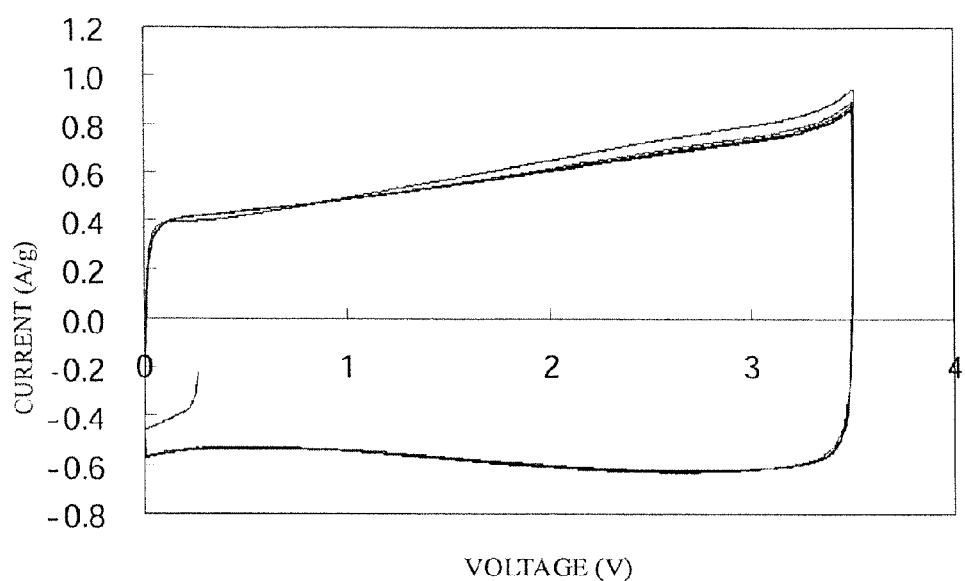
FIG. 10 is a cyclic voltammogram of the electric double layer capacitor, which is measured in Example 2.
Figure 11:
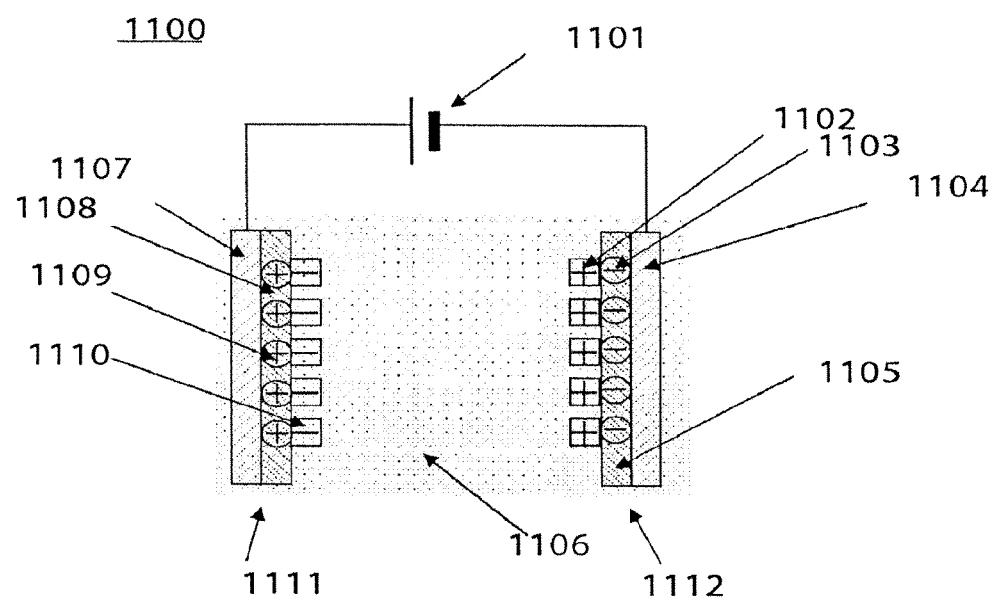
FIG. 11 is a diagram showing one example of the configuration of a common electric double layer capacitor.
Figure 12:
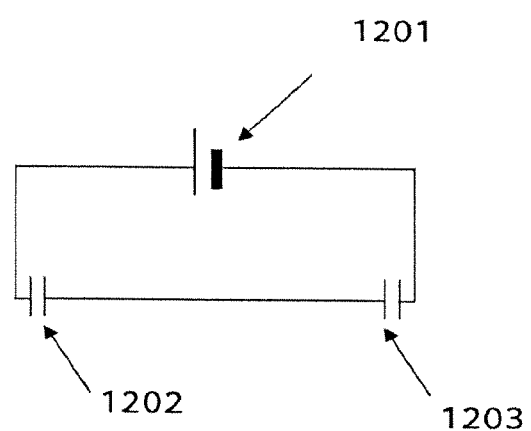
FIG. 12 is a diagram showing one example of an electrical equivalent circuit of the common electric double layer capacitor.
Figure 13:
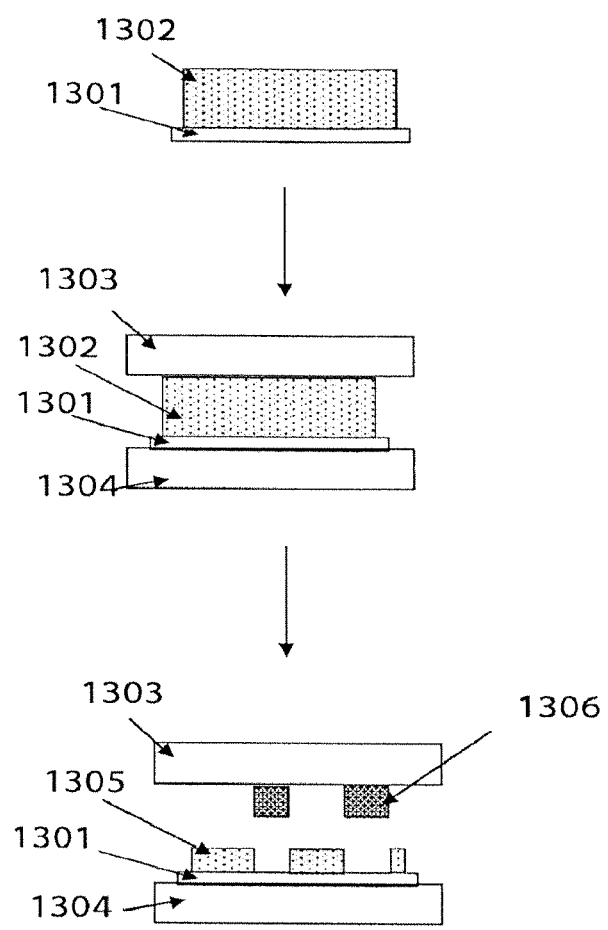
FIG. 13 is a diagram showing one example of a method for directly compressing a fine fiber layer on a current collector by a conventional method.

A cyclic voltammogram measurement was carried out at a voltage sweep rate of 40 mV/sec in a voltage range from 0V to 3.5V with respect to the electrode impregnated with the electrolytic solution as above. A graph obtained by the measurement is shown in FIG. 10. As shown in FIG. 10, the electric double layer capacitor of Example 2 shows good capacitor properties.

Moreover, charge and discharge properties of the above electrode were measured. The electrode was charged by a constant current of 0.2 A/g up to 3.5 V and then discharged by a constant current of 0.2 A/g. The condenser capacitance was calculated from the inclination of a straight line plotted regarding the time and voltage of the discharge. A condenser capacitance C is obtained by $C = I \times \Delta t / \Delta V$, where I denotes the discharge current and $\Delta V$ denotes a voltage change with respect to a time change $\Delta t$. As a result, the capacitor capacitance was 13 F/g. The energy density per liter of the active material was 5.1 Wh/L.

In contrast, in a case where the electric double layer capacitor was manufactured by placing the positive electrode and the negative electrode opposed to each other with the separator sandwiched therebetween without compressing the carbon nanotubes, the energy density per liter of the active material was 0.26 Wh/L. Therefore, the energy density could be increased about 20 times by the pressure bonding step.

Example 3

Example 3 will explain an example in which: the positive electrode manufactured in Example 1 and the positive electrode separator were pressure bonded to be integrated with each other; the negative electrode manufactured in Example 1 and the negative electrode separator were pressure bonded to be integrated with each other; and the electric double layer capacitor was manufactured by overlapping these separators each other.

The compressed stack body manufactured as in Example 1 and including the positive electrode and the positive electrode separator and the compressed stack body manufactured as in Example 1 and including the negative electrode and the negative electrode separator overlapped each other such that the separators thereof were opposed to each other. This was fixed by a Teflon plate and immersed in the electrolytic solution. The method for immersing was the same as the method described in Example 2, so that an explanation thereof is omitted.

The capacitor property was measured in the same manner as in Example 2. The measurement method and the method for calculating the capacitance were the same as those explained in Example 2, so that explanations thereof are omitted. As a result, the capacitor capacitance was 9 F/g. The energy density per liter of the active material was 1.0 Wh/L. Therefore, the energy density could be increased about four times by the configuration of Example 3.

Example 4

In Example 4, advantages were studied, which were obtained by carrying out a step of compressing the fine fibers by weak pressure before the fine fibers standing on the current collector and the separator are pressure bonded by high pressure. The carbon nanotubes were used as the fine fibers.

Examined was whether or not the short-circuit between the positive electrode and the negative electrode occurs in each of the electric double layer capacitor obtained in a case where the Si wafer is placed on the carbon nanotubes and the carbon nanotubes are compressed (pre-pressurized) by pressure of 4 MPa by which the carbon nanotubes are not transferred to the Si wafer and the electric double layer capacitor obtained in a case where the Si wafer is placed on the carbon nanotubes and the carbon nanotubes are not compressed (pre-pressurized). The method for manufacturing the electric double layer capacitor is the same as the method explained in Example 2 except that the pressure in the pressure bonding step was variously changed within a range from 30 to 70 MPa.

The manufactured capacitor was charged and discharged between 0 and 2.5V. It was determined that the short-circuit occurred when (Electric Charge Required for Charging)/(Electric Charge Required for Discharging) was 1.3 or more. Results are shown in Table 1.

In accordance with Table 1, in a case where the pre-pressurizing step was carried out, the short-circuit did not occur regardless of the pressure in the pressure bonding step, but in a case where the pre-pressurizing step was not carried out, the short-circuit occurred when the pressure in the pressure bonding step becomes 60 MPa or more. Here, by carrying out the pre-pressurizing step, tip ends of the fine fibers (carbon nanotubes) located in a direction perpendicular to or substantially perpendicular to the separator used for the compression were bent in a direction parallel to or substantially parallel to the separator. Therefore, when the fine fibers (carbon nanotubes) are compressed by high pressure, they do not break through the separator but are compressed.

TABLE 1

| Pressure (MPa) in Pressure Bonding Step | Pre-pressurizing Step was Performed | Pre-pressurizing Step was not Performed |
|---|---|---|
| 30 | not short-circuited | not short-circuited |
| 40 | not short-circuited | not short-circuited |
| 50 | not short-circuited | not short-circuited |
| 60 | not short-circuited | short-circuited |
| 70 | not short-circuited | short-circuited |

INDUSTRIAL APPLICABILITY

In accordance with the electric double layer capacitor of the present invention, the density of the fine fibers forming the active material layer is high, and the energy density can be improved. Therefore, the electric double layer capacitor of the present invention is useful as an energy source of, for example, a mobile terminal, such as a mobile phone or a mobile computer, or a moving device, such as a vehicle, a bicycle, or a train.

| Reference Signs List | |
|---|---|
| 200 | electric double layer capacitor |
| 201, 203 | current collector |
| 202, 204 | fine fiber |
| 205, 205a, 205b | separator |
| 206 | positive electrode |
| 207 | negative electrode |

-continued

Reference Signs List

| | |
|---|---|
| 301, 303 | current collector |
| 302, 304 | fine fiber |
| 305 | separator |
| 306 | positive electrode |
| 307 | negative electrode |
| 401, 403 | current collector |
| 402, 404 | fine fiber |
| 405a, 405b | separator |
| 406 | positive electrode |
| 407 | negative electrode |
| 501, 503 | current collector |
| 502, 504 | fine fiber |
| 505 | separator |
| 506 | positive electrode |
| 507 | negative electrode |
| 510, 511, 512, 513 | pre-pressurizing plate |
| 601, 603 | current collector |
| 602, 604 | fine fiber |
| 605a, 605b | separator |
| 606 | positive electrode |
| 607 | negative electrode |
| 610, 611, 612, 613 | pre-pressurizing plate |
| 1100 | electric double layer capacitor |
| 1101 | power supply |
| 1102 | positive ion |
| 1103 | negative electric charge |
| 1104 | current collector |
| 1105 | active material |
| 1106 | electrolytic solution |
| 1107 | current collector |
| 1108 | active material |
| 1109 | positive electric charge |
| 1110 | negative ion |
| 1111 | positive electrode |
| 1112 | negative electrode |
| 1201 | power supply |
| 1202 | condenser formed at the positive electrode |
| 1203 | condenser formed at the negative electrode |
| 1301 | current collector |
| 1302 | fine fiber |
| 1303, 1304 | compression plate |
| 1305 | fine fibers remaining on the current collector |
| 1306 | transferred fine fibers |

The invention claimed is:

1. An electric double layer capacitor configured such that a positive electrode, a separator, and a negative electrode stacked in this order are contained in a container, and a portion between the positive electrode and the negative electrode is filled with an electrolytic solution, wherein:
   a polar plate of one or each of the positive electrode and the negative electrode includes a current collector and a plurality of electrically-conductive fine fibers formed and standing on a surface of the current collector such that one end of each of the fine fibers is electrically connected to the surface of the current collector;
   a surface of the polar plate is covered with the separator, the surface corresponding to the surface of the current collector; and
   the polar plate and the separator are pressure bonded to be integrated with each other so that a stress of more than $2.5 \times 10^4$ Pa is required to separate the separator and the polar plate from each other.

2. The electric double layer capacitor according to claim 1, wherein the positive electrode, the separator, and the negative electrode are pressure bonded in this order to be integrated with one another.

3. The electric double layer capacitor according to claim 1, wherein:
   the separator includes a positive electrode separator and a negative electrode separator; and
   the positive electrode and the positive electrode separator are pressure bonded to be integrated with each other, and the negative electrode and the negative electrode separator are pressure bonded to be integrated with each other.

4. The electric double layer capacitor according to claim 1, wherein each of the fine fibers has a diameter of 0.1 to 100 nm.

5. The electric double layer capacitor according to claim 1, wherein the fine fibers are carbon nanotubes.

6. The electric double layer capacitor according to claim 1, wherein the separator is made of a material other than a thermosetting resin.

7. The electric double layer capacitor according to claim 1, wherein the fine fibers entwine with a fiber-like material of the separator, or stick in a sheet of the separator.

8. A method for manufacturing an electric double layer capacitor configured such that a positive electrode, a separator, and a negative electrode stacked in this order are contained in a container, and a portion between the positive electrode and the negative electrode is filled with an electrolytic solution, comprising:
   a preparing step of preparing a separator and a polar plate including a current collector and a plurality of electrically-conductive fine fibers formed and standing on a surface of the current collector such that one end of each of the fine fibers is electrically connected to the surface of the current collector;
   a covering step of covering a surface of the polar plate with the separator, the surface corresponding to the surface of the current collector, to form a stack body including the polar plate and the separator;
   a pressure bonding step of forming a pressure bonded stack body by applying pressure, which is not lower than 30 MPa and not higher than 70 MPa, to the stack body from an upper side and a lower side to cause the polar plate and the separator to be pressure bonded to be integrated with each other; and
   an impregnating step of impregnating the pressure bonded stack body with an electrolytic solution.

9. The method according to claim 8, wherein:
   in the preparing step, two polar plates and one separator are prepared;
   in the covering step, the polar plates and the separator are stacked on one another such that the surfaces of the polar plates sandwich the separator and are opposed to each other; and
   in the pressure bonding step, the polar plates and the separator are pressure bonded to form the pressure bonded stack body.

10. The method according to claim 8, wherein:
    in the preparing step, two polar plates and two separators are prepared;
    in the covering step, the surfaces of the polar plates are respectively covered with the separators to form two stack bodies;
    in the pressure bonding step, two pressure bonded stack bodies, each formed by pressure bonding the polar plate and the separator, are formed; and
    before or after the impregnating step, further included is a step of overlapping the pressure bonded stack bodies each other such that the separators thereof contact each other.

11. The method according to claim 8, further comprising, after the preparing step and before the covering step, a pre-pressurizing step of applying pressure, which is lower than the pressure in the pressure bonding step, to the electrically-conductive fine fibers on the current collector to incline the fine fibers.

12. The method according to any one of claim 8, wherein each of the fine fibers has a diameter of 0.1 to 100 nm.

13. The method according to claim 8, wherein the fine fibers are carbon nanotubes.

14. The method according to claim 13, wherein the carbon nanotubes are formed and stand on the surface of the current collector via catalysts.

15. The method according to claim 8, wherein in the pressure bonded stack body, the fine fibers entwine with a fiber-like material of the separator, or stick in a sheet of the separator.

* * * * *